July 10, 1928.
J. D. CUMMINGS
1,676,688
BOOM ATTACHMENT FOR TRACTORS
Filed July 24, 1926
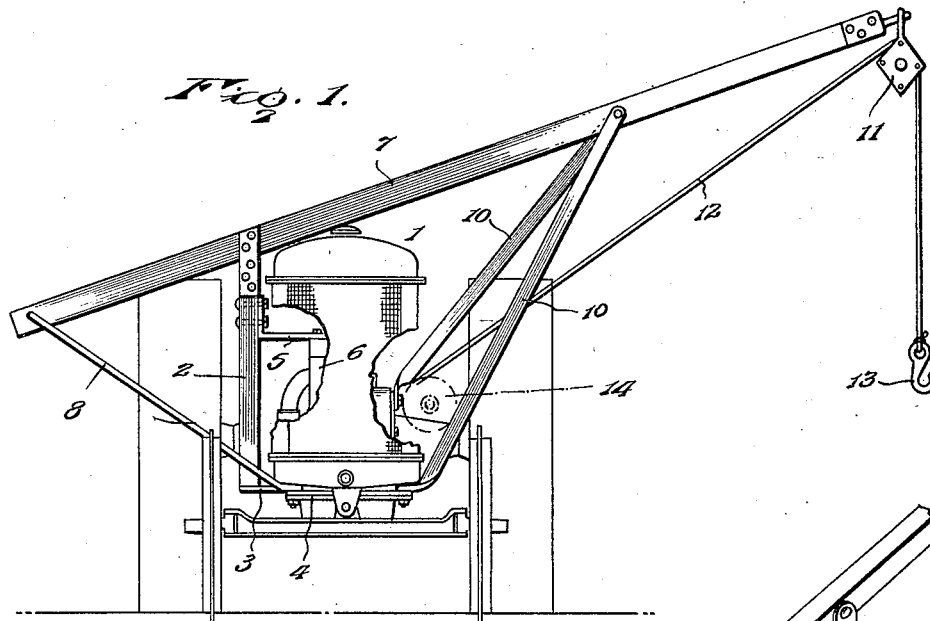
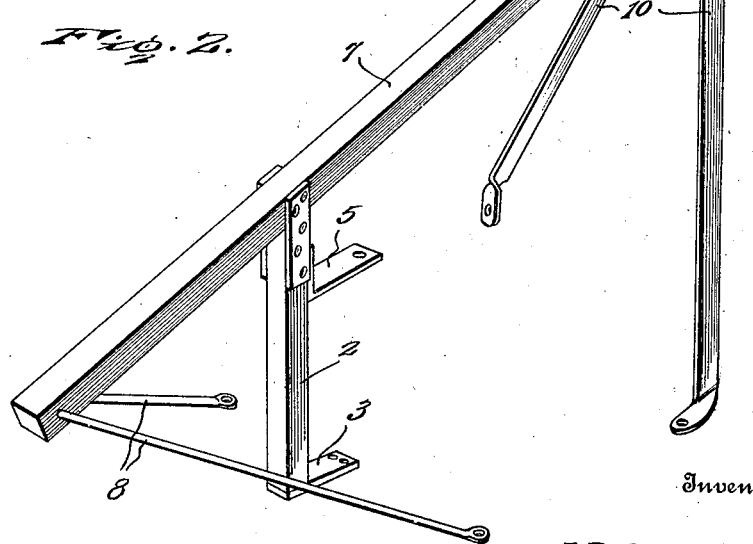
Inventor
J. D. Cummings.
By Lacey & Lacey, Attorney.

Patented July 10, 1928.

1,676,688

UNITED STATES PATENT OFFICE.

JAMES D. CUMMINGS, OF HOUSTON, TEXAS, ASSIGNOR OF ONE-HALF TO CARL J. MANAUGH, OF HOUSTON, TEXAS.

BOOM ATTACHMENT FOR TRACTORS.

Application filed July 24, 1926. Serial No. 124,712.

This invention is an attachment for tractors and has for its object the provision of means whereby heavy weights may be easily handled through utilization of the power generated by the tractor engine. The apparatus is intended more particularly for use in laying heavy pipe in ditches but, of course, may be employed wherever the handling of heavy objects is required. The invention is illustrated in the accompanying drawing and will be hereinafter fully set forth.

In the drawing:

Figure 1 is a front elevation, partly broken away, of a tractor showing the apparatus of the invention applied thereto;

Fig. 2 is a detail perspective view of the attachment removed from the tractor.

In the drawing, the reference numeral 1 indicates a tractor which may be of any well-known or approved design. In carrying out the invention, I provide a post or standard 2 which is adapted to be disposed at one side of the tractor and is equipped at its lower end with a laterally extending bracket 3 adapted to be bolted or otherwise rigidly secured to the flanges 4 of the crank shaft case of the tractor engine, and near its upper end is equipped with a bracket 5 extending laterally therefrom and adapted to be secured rigidly to the top of the engine block, indicated at 6. Resting upon and secured to the upper end of the standard or post 2 is a boom 7 which is preferably disposed obliquely and extends transversely across the power plant of the tractor, as clearly shown in Fig. 1. The boom extends beyond both sides of the tractor and to the lower end of the boom are secured braces 8 which diverge downwardly and inwardly therefrom to be secured to the flanges 4 of the crank case. At the opposite side of the tractor, I provide braces 10 which are secured at their upper ends to the boom 7 and diverge downwardly and inwardly therefrom, the lower end of the front brace being secured to the flanges 4 and the lower end of the rear brace being secured to the differential casing, indicated at 9. At the upper end of the boom is suspended an idle pulley block 11 over which a cable 12 is trained, the said cable being equipped at one end with a hook 13 or other implement whereby the weight to be carried may be suspended in an obvious manner. The opposite end of the cable is carried to and wound upon a windlass or winding shaft, indicated at 14 in dotted lines, mounted in any convenient manner upon the tractor to be controlled from the operator's seat. The particular construction of the windlass constitutes no part of my present invention and detailed illustration of the same has been omitted from the drawing for the sake of clearness.

From the foregoing description, taken in connection with the accompanying drawing, it will be seen that I have provided a very simple, strong and durable apparatus which may be easily secured to or removed from a tractor and by the use of which heavy weights may be easily supported at one side of the tractor and carried from point to point by travel of the tractor. The device is particularly useful in laying heavy pipe in ditches or drains and for such purpose the pipe sections are placed alongside the ditch, as is the usual practice, to be moved into the ditch as the laying and joining of the sections progresses. The free end of the cable is passed around a section which is to be laid and secured by engaging the hook 13 about the cable over the pipe section. If the cable be then wound, the pipe section will be lifted from the ground and may then be easily pushed by workmen into position over the ditch, and lowered into the ditch by permitting the cable to unwind.

Having thus described the invention, I claim:

A derrick attachment for tractors comprising a boom to extend transversely across a tractor above the same with its end portions projecting from opposite sides of the tractor, a cable guide at the forward end of said boom, a standard disposed vertically below said boom in spaced relation to the rear end thereof and having its upper end rigidly connected with the boom, upper and lower arms projecting laterally from said standard and adapted to be secured respectively to the block and crank case of the engine at one side of the tractor, brace rods carried by the rear end of said boom and extending downwardly therefrom and adapted to be secured to the crank case at the adjacent side of the tractor, and bracing bars connected with the boom intermediate the standard and forward end of the boom to extend downwardly from the boom at the opposite side of the tractor from the standard and having their lower ends adapted to be secured to the engine at the opposite side thereof from the brace rods.

In testimony whereof I affix my signature.

JAMES D. CUMMINGS. [L. S.]